June 25, 1968

A. J. VAN NOORD 3,389,874

SEAT BELT RETRACTOR

Filed May 16, 1966

INVENTOR.
Andrew J. Van Noord
BY
Dale A. Winnie
ATTORNEY

June 25, 1968 A. J. VAN NOORD 3,389,874
SEAT BELT RETRACTOR

Filed May 16, 1966 2 Sheets-Sheet 2

INVENTOR.
Andrew J. Van Noord
BY
Dale A. Winnie
ATTORNEY

United States Patent Office 3,389,874
Patented June 25, 1968

3,389,874
SEAT BELT RETRACTOR
Andrew J. Van Noord, Grand Rapids, Mich., assignor to Kent Engineering, Grand Rapids, Mich., a partnership
Filed May 16, 1966, Ser. No. 550,517
9 Claims. (Cl. 242—107.2)

This invention relates to seat belt retractors in general and, more particularly, to a locking type retractor for use with automotive and other vehicle seat belts.

Most seat belt retractors require that the seat belt be drawn out to full length before being placed in service. This assures anchoring and strain through the belt to the vehicle floor or other mounting structure. However, unintentionally and sometimes as a matter of personal comfort, persons using a retractable seat belt leave some slack in the belt, under tension of the retractor, and defeat the very purpose of using it in the first place.

This invention is directed to a retractor which includes means of positively locking the belt in intermediate positions and so that the strain, in use, is transmitted through to the anchoring structure. Moreover, the retractor assures such locking automatically and so that unintentional slack cannot be left in the seat belt while in service.

The retractor disclosed is relatively simple in construction and therefore capable of manufacture, assembly and sale at a reasonable cost.

These and other objects and advantages of this invention will appear more clearly from the following more detailed description, and from the drawings, wherein.

Figure 1:
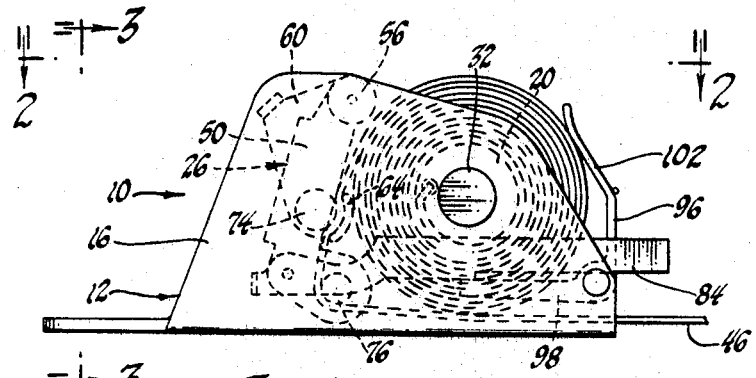
FIGURE 1 is a side elevation of a retractor showing the belt-part fully retracted.
Figure 2:
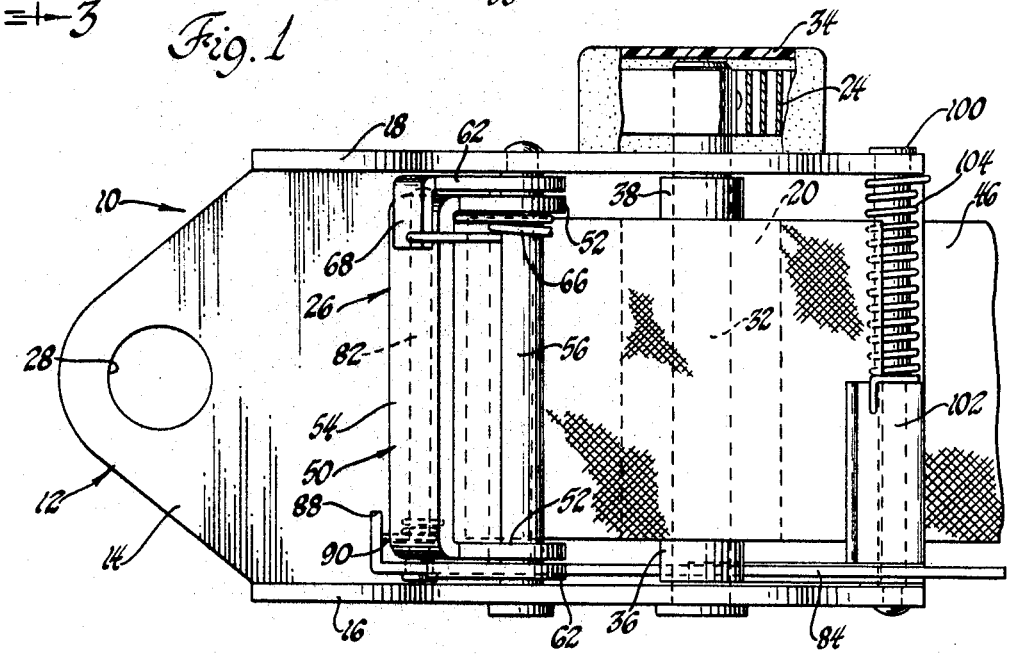
FIGURE 2 is a top plan view taken substantially along the line 2—2 of the first drawing figure.
Figure 3:
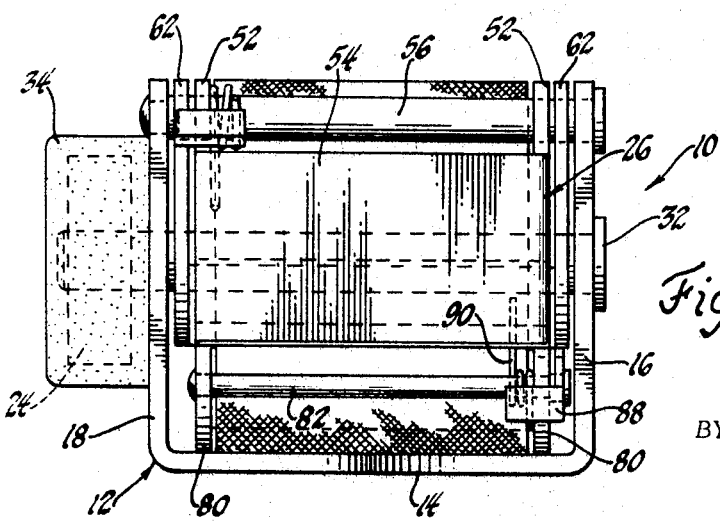
FIGURE 3 is a side elevation taken substantially along line 3—3 of the first drawing figure.

The retractor 10 includes a housing or mounting bracket 12 having a base 14 and side walls 16 and 18. A reel or spool 20 is mounted between the side walls, and has a seat belt strap 22 wound thereon. Clock spring means 24, shown only in FIGURES 2 and 3, bias the reel or spool 20 for keeping the seat belt strap 22 wound thereon. In addition, an operative mechanism 26 is mounted between the side walls of the mounting bracket for locking engagement with the seat belt strap 22 in any intermediate or fully drawn out position thereof.

With this general reference to the major parts, we proceed now with a more detailed description of the various parts and their inter-relation.

The housing or mounting bracket 12 includes a hole 28 provided in the base 14 for anchoring the bracket; normally with the base disposed in a vertical position. A center setcion 30 of the base is cut away under the reel or spool 20.

The reel or spool 20 is mounted on a pin or shaft 32 supported between the bracket side walls 16 and 18. The biasing spring 24 is engaged to one end thereof and a housing or cap 34 is fixed to the outer side of the side wall 18 to enclose the spring member. The reel or spool includes hub portions 36 and 38 for spacing it between the side walls of the mounting bracket and it is held on the shaft 32 by a key-slot arrangement 40. The bare spool is formed to include a slot or groove 42 thereacross in which an end of the seat belt strap 22 is received and held as by a clip 44.

The seat belt strap 22 is wound on the reel or spool 20 and has the outer disposed end 46 threaded through the operative mechanism 26, for the purposes to be described, and extended beyond the retractor for engagement with a seat belt buckle or tongue part, not shown.

The operative mechanism 26 for holding the belt in desired locking positions is mounted behind and in parallel spaced relation to the reel or spool 20. It includes a member 50 having like side wall parts 52 and a connecting web wall 54. It is mounted and pivotal on a pin or shaft 56 disposed outwardly and high on the side walls of the mounting bracket structure.

A member 60, generally similar to the member 50, is also pivotally mounted on the pin 56. It includes side wall portions 62 and a connecting cross member 64. The member 60 has both of its side portions outside of the side walls 52 of the first mentioned pivotally mounted member.

The members 50 and 60 are pivotal relative to each other, on the same pin 56, and are held biased apart by a spring 66 engaging the back wall or web 54 of the member 50 and a tab 68 provided on one of the side walls of the member 60 and disposed for such purpose.

The cross piece 64 of the second mentioned member 60 is formed in a crescent shape to serve as a follower, riding against the seat belt webbing on the reel 20, and spacing the two members 50 and 60 relative thereto as webbing is wound up on and unwound from the reel 20. Its inner concave side 70 is knurled to serve as a brakeshoe in a manner later described.

The member 50 includes slots 72 in its side walls receptive of the ends of a knurled bar 74 of the type normally used in seat belt buckle construction for belt adjustment purposes. The bar is fixed against rotation, by its end engagement in the side wall slots 72, and in position for mating engagement with the concave side 70 of the brake-shoe cross piece 64.

The terminal end 46 of the seat belt 22 is passed between the bar 74 and the brake-shoe cross piece part 64, as shown in the different drawing figures. It also passes over a smooth surfaced bar 76 with ends formed for mounting and fixed positioning in a semi-circular openings, not shown, provided in the side wall parts of member 50. This latter smooth surfaced member serves to keep the seat belt webbing positioned between the bar 74 and the brake-shoe part 64 in their different positions, and another purpose, later described.

The first mentioned pivotally mounted part 50 has its side walls 52 formed to include forwardly extending parts 80, on which the bar 76 is mounted, and has a pin 82 mounted back and in parallel spaced relation behind it.

An extended operating arm member 84, operative of the whole latching mechanism, is mounted on the pin 82 and substantially in the plane of one of the side walls of part 60, disposed relatively thereover, in the drawing figures. It is cut out as at 86 to avoid interference with the hub of the reel when the belt webbing is fully extracted. It also includes a tab 88 for engagement by a tang of spring 90, mounted on the same pin 82, with it, and engaged with the connecting web 54 of part 50 to hold it biased out of interference engagement and for purposes more fully appreciated later.

From the foregoing, at ths point, it will be appreciated that parts 50, 60 and the arm member 84 are all pivotal together on pin 56 and also relatively pivotal with respect to each other.

Figure 4:
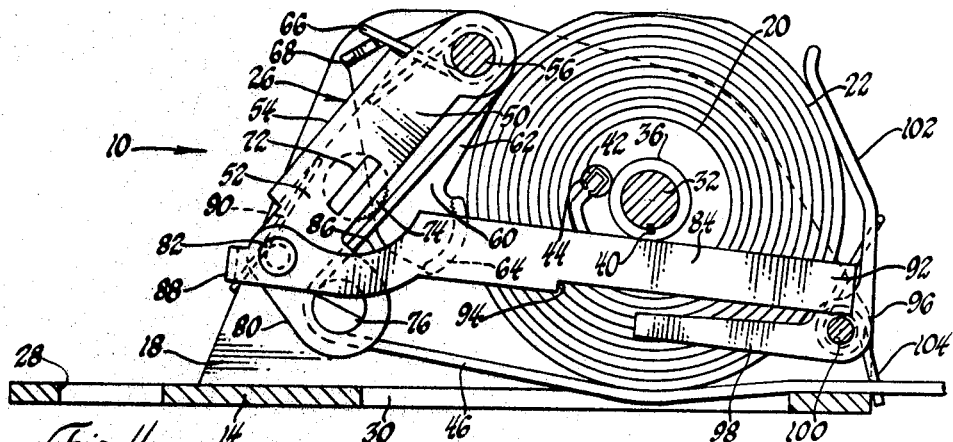
FIGURE 4 is an enlarged side elevation of the retractor, substantially the same as the first drawing figure, but with parts in different positions, and with the side wall of the mounting bracket removed.
Figure 5:
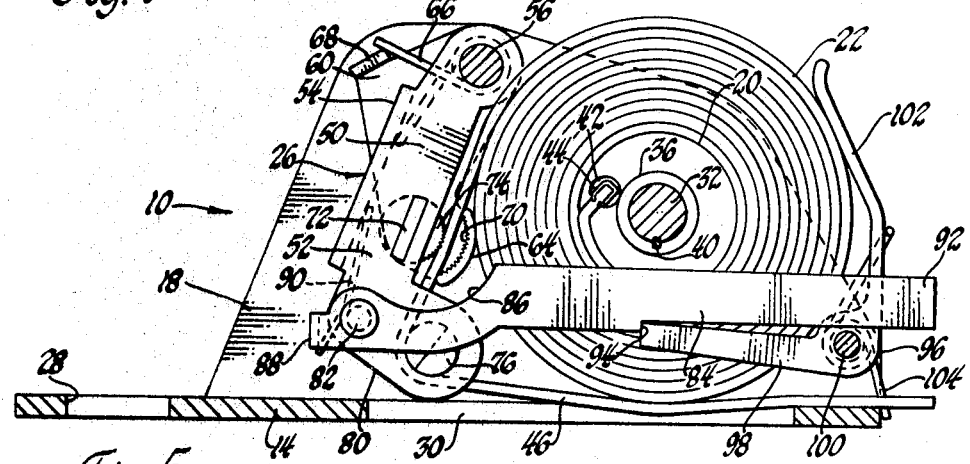
FIGURE 5 is a view similar to the last mentioned drawing figure with operative parts in different positions.
Figure 6:
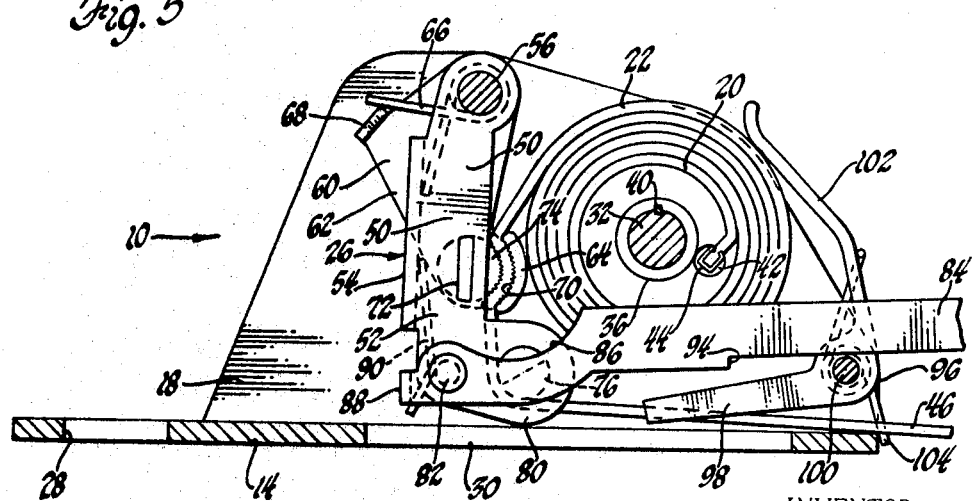
FIGURE 6 is a side elevation similar to the last two drawing figures and showing the parts in still different positions.

Referring most closely to FIGURES 4–6, it will be seen that the operating arm member 84 is of such length that its free end 92 is accessibly disposed at the far end of the retractor; or thereover as vertically mounted for use. Also, it includes a notch or shoulder 94 intermediate its ends and about mid-way therebetween.

An L-shaped or bell crank member 96 is provided with one arm 98 thereof disposed for engagement in the notch or shoulder 94 of the operating arm 84. It is otherwise mounted on a pin 100 supported by the spaced side walls 16 and 18 of the housing member at the far end (with reference to the drawings) of the retractor. The other arm 102 is of sufficient width to lie over the seat belt webbing on the reel or spool 20 and is both held to one side and biased for engagement with the webbing on the reel by spring means 104.

The operation of the retractor, in use, will be described very briefly first and then in greater detail.

Referring to FIGURE 5, when the operating and lever arms 84 and 98 are engaged, the member 50 is held in a relatively fixed position as the seat belt strap is drawn off the reel 20. The part 60, however, is biased relative to the member 50 and pivotal to follow the diminishing size of the webbing on the spool as it is withdrawn. Also, when the operating and lever arms 84 and 98 are engaged, as shown, the spacing between the bar 74 and brake-shoe part 64 is sufficient to allow the belt to be withdrawn without interference.

Referring to FIGURE 6, when the operating and lever arms 84 and 98 are disengaged, from each other, the member 50 is free to pivot on pin 56 forwardly, referring to the drawings, and to close the gap between the bar 74 and brake-shoe 64. When this occurs, the belt webbing is locked between the bar and shoe and strain on the belt acting on the bar 76 holds the whole pivotal mechanism tight against the webbing roll still on the reel.

FIGURE 4 is not of an operational position of the parts of the retractor mechanism, but is to show their relative relationships only. The gap between the notch or shoulder 94 and the end of the lever arm 98, and that between the bar 74 and brake-shoe 64, are never this great.

Returning now to a more detailed description of the use and operation of the retractor:

When the seat belt 22 is fully wound up on the reel 20 of the retractor, the follower arm 102 is held disposed in the position shown by FIGURE 5 on the outer periphery of the webbing roll. The lever arm part 98 thereof is similarly held in position for engagement in the shoulder or notch 94 of the operating arm 84. The latter is in turn biased by spring 90 for engagement with the lever arm. As previously mentioned, this holds the pivotal part 50 in a relatively fixed position, for the moment, and the biasing spring 66 holds the member 60, and more particularly the brake-shoe 64, spaced from the bar 74 enough for the belt strap to be drawn therebetween as desired and without interference.

In the course of drawing the seat belt strap from the retractor, under a steady pull, it passes lightly and without interference relative to the knurled bar 74 and over the smooth surfaced bar 76; itself in a fixed position, mounted as it is on member 50, and adding a holding force between the operating and lever arms 84 and 98 through their shouldered engagement. The follower arm 102 will stand out from the spool, and not follow it, because of the engagement between the operating and lever arm parts 84 and 98.

The moment the force drawing the seat belt strap off the reel 20 lets up, the holding force through bar 76 is released and the spring 104 kicks the lever arm 98 out of engagement with the operating lever 84 in its biased effort to follow the diminishing size of the webbing roll on the reel.

The operating arm 84 rides on pin 100 and moves with the member 50 now released from its formerly held position. The spool or reel 20, biased to take up slack in the belt, and the force holding the belt in its withdrawn position, both serve to draw the member 50 tight against the webbing roll and this effort, against bar 76 is sufficient to overcome the spring 66 holding the brake-shoe 64 spaced from the knurled bar 74 and to effect the locking engagement of the belt therebetween.

Once the locking engagement has been effected, extraction of the belt webbing is precluded but further winding of the webbing on the spool, to take up slack in the belt, is still permitted. The absence of tension in the belt as when drawing it off the spool or under other strain, reduces the pull on bar 76. This allows spring 66 to separate bar 74 from shoe 70 and enables the spool tensioning spring 24 to wind up any slack in the belt.

The end result is a seat belt retractor which enables automatic adjustment to the requirements of the wearer. After the belt is fastened about the wearer, it will take up slack to a snug but comfortable extent and no undue slack is unintentionally left in the belt.

If a person is sitting forward when the belt is fastened, the belt will automatically adjust and take up the slack when he sits back in the seat.

The continuous biasing effort to take in the slack in the belt also provides for automatically rewinding the belt on the spool when the belt buckle is released and the safety belt is not in use.

It is worth noting that the retractor also includes an anti-cinch feature.

In many locking retractors, particularly those using a ratchet and tooth lock on the spool, a comfortably snug belt will cinch up a notch or two and become too tight for comfort when driving over bumps or when the wearer adjusts back in his seat or otherwise allows this to happen.

The retractor disclosed allows just enough slack in the initial separation of the belt locking members, under the influence of spring 66, and before the spool biasing spring 24 comes into use, to prevent this cinching action to occur. This is not enough to be noticeable to the wearer and occurs principally within the retractor housing. It is essentially only that which keeps the locking means separated to permit the spool biasing spring to keep the belt comfortably tensioned and which is absorbed immediately when the locking means come into service.

Lever 84 is provided principally to enable a person to temporarily loosen the seat belt to shift positions, as for reaching the glove compartment or otherwise, without disconnecting the seat belt and perhaps forgetting to place it in service again. When the lever is released, the slack in the belt is again taken up to a comfortable and secure fit.

It is only when all of the webbing is rewound on the spool that the lever is temporarily locked out of service.

Basically, the retractor of this invention provides an operating mechanism which includes means for locking engagement with the seat belt and intermediate means for holding the locking means inactive until needed. The intermediate means is, in turn, in strain responsive engagement with the seat belt and adapted to actuate the locking means in opposition to any effort to withdraw the seat belt beyond the initial effort to place the belt in service. The seat belt is under constant but comfortable tension when in use and capable of adjusting itself automatically to a more secure extent and for being automatically rewound in the retractor when not needed. No further play-out in the belt is permitted when it is in service, except by use of lever 84.

Although a preferred embodiment of this invention has been shown and described in detail, it will be appreciated that certain modifications and improvements are within the scope of the teachings set forth. Accordingly, such of these improvements and modifications as are within the spirit of the invention and are not specifically excluded by the language of the hereinafter appended claims, are to be considered as inclusive thereunder.

I claim:

1. A seat belt retractor comprising, a mounting bracket having spaced side walls and including a reel mounted between said side walls, having a seat belt engaged thereto and biased for winding said seat belt thereon, an operative mechanism mounted between said side walls and receiving said seat belt in threaded engagement therethrough in the course of being wound on and unwound from said reel, said operative mechanism including means of locking engagement with said seat belt as received in threaded engagement therethrough, means connected to said operative mechanism, for holding said locking means inactivated, and disposed in strain responsive engagement with said seat belt for activation of said locking means upon strain relieving release of said seat belt in the course of being withdrawn from said reel, said operative mechanism being pivotally mounted between said side walls and including two parts pivotal relative to each other and biased for separation and to receive said seat belt therebetween, and means provided on one of said two parts for receiving said seat belt in threaded engagement thereover, and under the retracting bias of said reel, for drawing said parts together against said reel and closing the separation therebetween for latching engagement with said seat belt thereby.

2. The seat belt retractor of claim 1, said means for holding said operative mechanism inactivated being operatively connected to said one part.

3. The seal belt retractor of claim 2, said holding means being manually operative and extended beyond said mounting bracket for easy use.

4. In a retractor for seat belts including a mounting bracket having spaced side walls, a reel rotatably mounted between said side walls, a seat belt wound on said reel, and means biasing the reel for winding the seat belt thereon, the improvement comprising;

a pair of members disposed between the side walls of the mounting bracket and pivotal on a common axis relative to the seat belt reel, means provided between said members for biasing them apart and receiving the seat belt from said reel therebetween, means for biasing the outermost of said pair of members towards the reel for trapping engagement of the other member thereof and latching engagement of the seat belt received between said members, said first mentioned biasing means being stronger than said last mentioned biasing means for overcoming the latter, and operative means engaging said outermost member for overcoming said first mentioned biasing means and holding said members together against said reel.

5. The improved retractor of claim 4, said outermost member having said seat belt received in engagement therewith in passing from and to said reel, and said last mentioned biasing means being provided through said seat belt engagement with said outermost member and under the tension of the means biasing the reel for winding said seat belt thereon.

6. The improved retractor of claim 4, including;

latching means for inactivating engagement with said operative means and responsively disposed and connected to said reel for operation in response to the size of said reel with the seat belt wound thereon and unwound therefrom.

7. The improved retractor of claim 6, said latching means including a lever arm member pivotally connected to the outermost of said members and subject thereby to the biasing means acting towards said reel, a latch member disposed for shouldered engagement with said lever arm member in the holding position thereof and biased for disengagement relative thereto, and said latch member including a follower arm disposed relative to said reel for engagement with the seat belt wound thereon and for positioning said latch member for shouldered engagement with said operative means upon substantially full retraction and winding of the seat belt on the reel.

8. A seat belt retractor, comprising;

a housing having spaced side walls and including a reel rotatably mounted therebetween, having a seat belt engaged thereto and biased for winding said seat belt thereon, a pair of belt engaging members pivotally mounted on a common axis and disposed between said housing side walls for receiving said seat belt in threaded engagement therebetween in being wound on and unwound from said reel, means biasing said belt engaging members apart and leaving said belt subject to the rewinding bias of said reel, said belt engaging members having one thereof disposed outermost relative to said reel and the other thereof disposed for trapped engagement between said outermost member and said reel and for engaging and holding said belt between said members, means provided on the outer most of said members and having said seat belt received thereover and thereby subjected to the rewinding effort of said biased reel and the strain imposed on said belt in service, and said last mentioned means being operative of said outermost member against the means biasing said belt engaging members apart for engaging and holding said belt therebetween and against said reel in response to strain in said belt as a consequence of unintentional efforts to unwind and withdraw said belt from said reel.

9. The seat belt retractor of claim 8, including;

latch means engaging said outermost member for inactivating said operative means in the course of the initial withdrawl of said belt for use and in strain responsive engagement with said belt for activation of said operative means following the first relief in the strain of withdrawing said belt for use.

References Cited

UNITED STATES PATENTS

| | | | |
|---|---|---|---|
| 3,262,738 | 7/1966 | Jantzen | 297—388 |
| 3,286,946 | 11/1966 | Board et al. | 242—107.2 |
| 3,323,831 | 6/1967 | Buechler | 297—388 |
| 3,341,150 | 9/1967 | Board et al. | 242—107.2 |

WILLIAM S. BURDEN, *Primary Examiner.*